(12) United States Patent
Sautter et al.

(10) Patent No.: US 8,282,254 B2
(45) Date of Patent: Oct. 9, 2012

(54) CARGO CARRIER WITH AERODYNAMIC ILLUMINATION DEVICE

(75) Inventors: Chris Sautter, Portland, OR (US); John Mark Elliott, Beaverton, OR (US); James Owen, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 184 days.

(21) Appl. No.: 12/877,049

(22) Filed: Sep. 7, 2010

(65) Prior Publication Data

US 2011/0084102 A1    Apr. 14, 2011

Related U.S. Application Data

(60) Provisional application No. 61/240,121, filed on Sep. 4, 2009.

(51) Int. Cl.
*B60Q 1/00* (2006.01)

(52) U.S. Cl. .......................... 362/496; 362/154; 362/183

(58) Field of Classification Search ................ 362/154, 362/183, 496; 224/316; 180/69.2
See application file for complete search history.

(56) References Cited

U.S. PATENT DOCUMENTS

| | | | |
|---|---|---|---|
| 5,155,668 A | 10/1992 | Tanner et al. | |
| 5,205,643 A | 4/1993 | Lin | |
| 6,120,165 A | 9/2000 | Shalvi | |
| 6,402,338 B1 | 6/2002 | Mitzel et al. | |
| 6,499,857 B1 | 12/2002 | Lumley | |
| 6,629,766 B2 * | 10/2003 | Cathel | 362/183 |
| 6,793,362 B2 | 9/2004 | Tai | |
| 6,918,521 B2 * | 7/2005 | Settelmayer et al. | 224/319 |
| 7,040,776 B2 | 5/2006 | Harrell et al. | |
| 7,350,692 B2 * | 4/2008 | Bushee et al. | 232/38 |
| 7,503,470 B2 * | 3/2009 | Settelmayer et al. | 224/319 |
| 7,740,157 B2 * | 6/2010 | Fisher et al. | 224/328 |
| 2004/0252492 A1 | 12/2004 | Peterson | |
| 2005/0213326 A1 * | 9/2005 | Sanford | 362/253 |

* cited by examiner

*Primary Examiner* — John A Ward
(74) *Attorney, Agent, or Firm* — Kolisch Hartwell, P.C.

(57) ABSTRACT

An aerodynamic cargo box configuration includes a bottom portion hinged to a lid. The lid has a receptacle for receiving a photovoltaic light device substantially flush with, and below, the outer surface of the lid. A photovoltaic light assembly may include a cup portion and a top portion, the top portion containing a photovoltaic cell and the bottom portion containing electronics and an array of one or more light elements configured to provide optimal illumination to an interior space of an elongate rectangular cargo box.

29 Claims, 3 Drawing Sheets

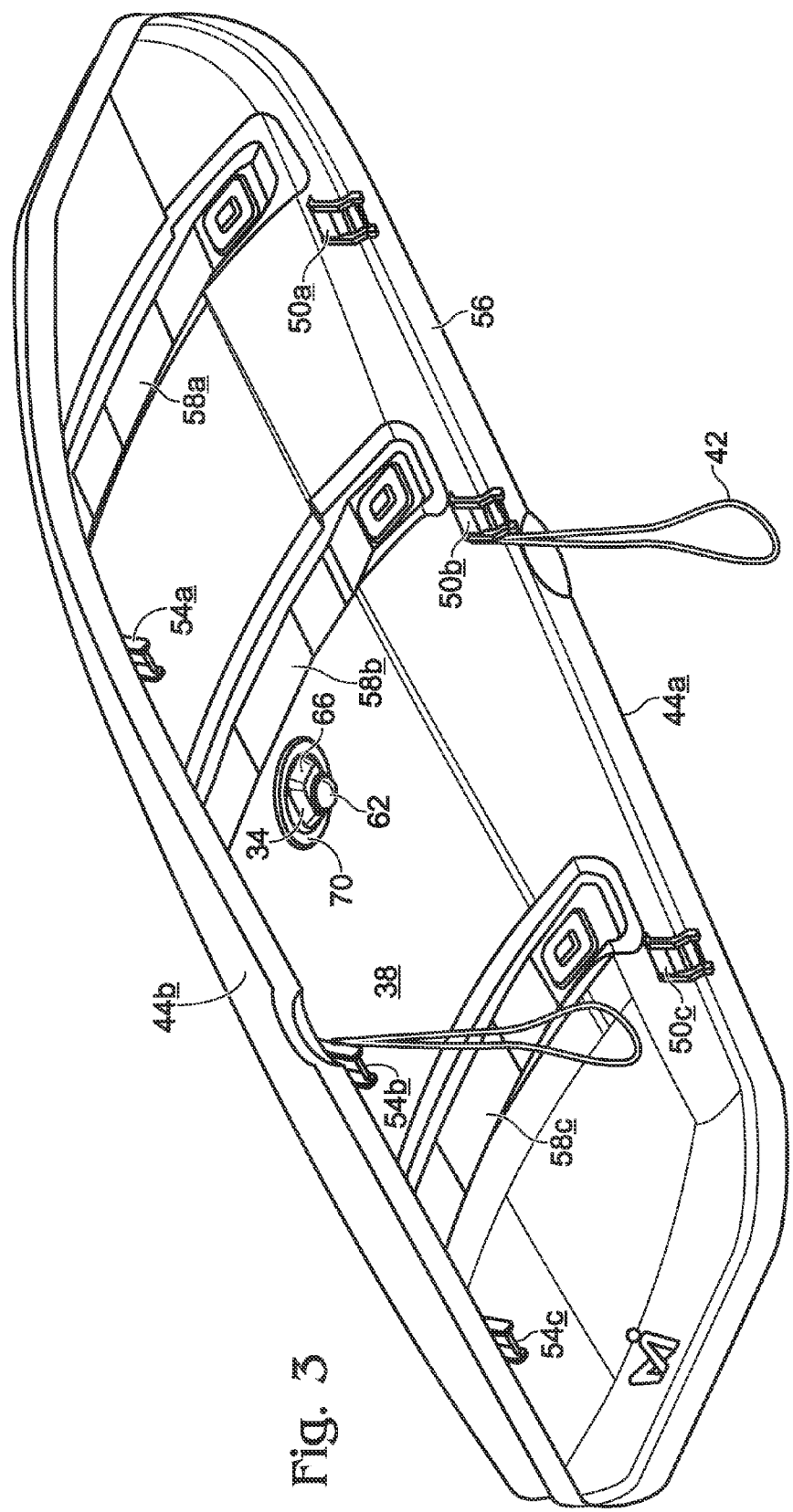

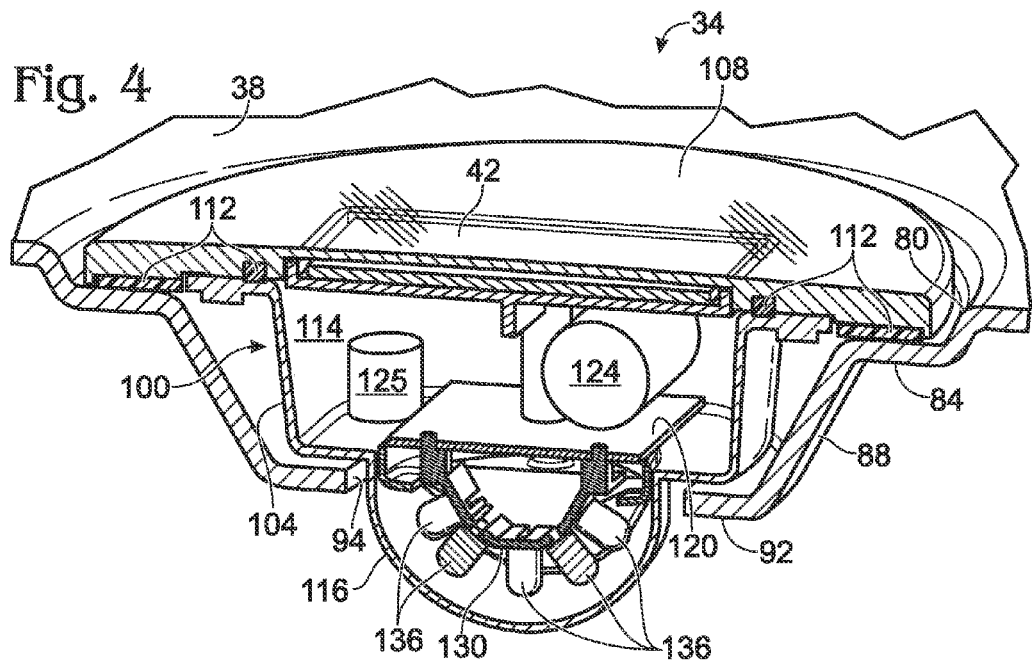
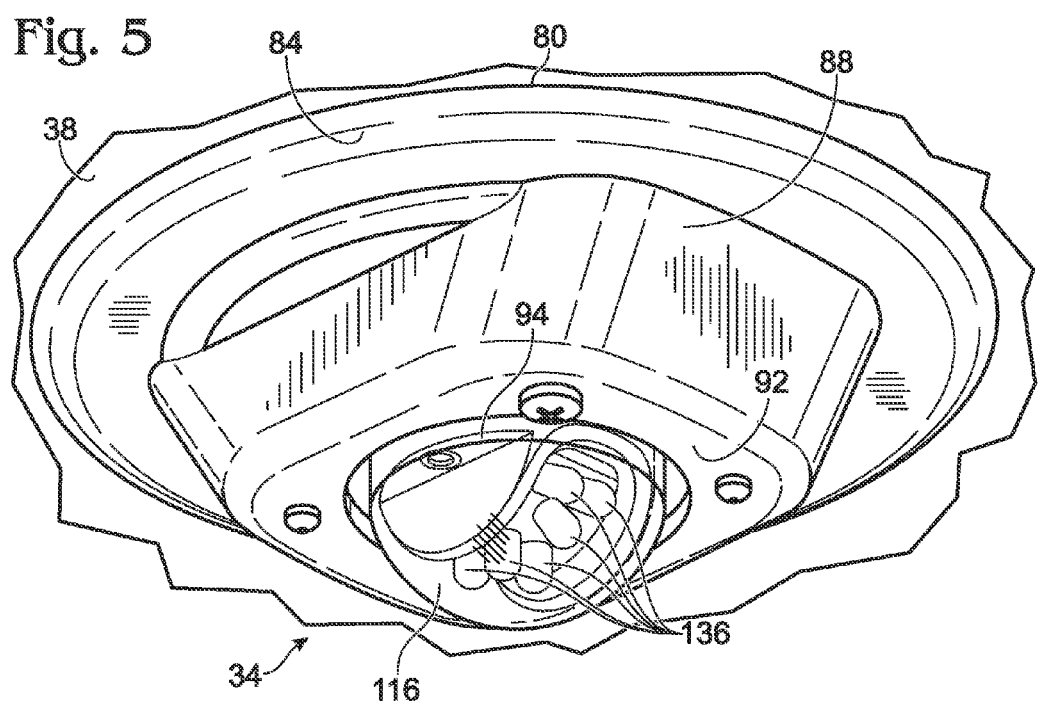

CARGO CARRIER WITH AERODYNAMIC ILLUMINATION DEVICE

CROSS-REFERENCE TO RELATED APPLICATION

This application claims priority from U.S. Provisional Patent Application Ser. No. 61/240,121, filed Sep. 4, 2009 which is incorporated herein by reference. This application incorporates by reference the following: U.S. patent application Ser. Nos. 12/494,218, 11/606,638, 29/308,271 and U.S. Pat. No. 7,416,098.

FIELD

The disclosed subject matter involves containers for carrying cargo on or in connection with a vehicle.

BACKGROUND

Cargo carriers, designed for clamping on a pair of crossbars mounted on top of a vehicle, continue to become more popular for increasing a vehicle's carrying capacity. External boxes provide a convenient compartment for carrying equipment or gear that may be desirably segregated from the main passenger compartment of the vehicle due to the shape or size of the cargo, or the fact that the cargo may be wet, dirty, etc. However, boxes present new challenges and problems to be addressed. For example, external boxes create extra drag creating noise and/or decreased efficiency (lower gas mileage). Boxes may make it difficult or impossible to safely drive in or under certain garages or parking structures due to their height above the vehicle. Boxes may also be difficult to access because of their location on top of a vehicle. It also may be difficult to view the interior of a cargo box due to its position or a lack of light. The box concepts described below may provide benefits and/or solutions to one or more of the problems mentioned above, among others.

SUMMARY

A cargo box is configured for mounting on a pair of crossbars on top of a vehicle. A box includes a bottom portion equipped with clamps for mounting on a pair of crossbars. A lid is connected via hinge/latch assemblies, either on one or both, lateral sides of the bottom portion of the box.

A receptacle may be provided in the lid of a cargo box for receiving a photovoltaic light device. The receptacle is configured to receive and support the light device substantially below and/or flush with the outer surface of the lid.

BRIEF DESCRIPTION OF THE DRAWINGS

FIG. 3 is an upward perspective view of the interior of the lid of the box shown in FIGS. 1 and 2.

FIG. 4 is a partial cross-sectional view through the lid shown in FIG. 3 illustrating inner components of a lid light.

FIG. 5 is a partial perspective view of the lid light shown in FIGS. 3 and 4.

DETAILED DESCRIPTION

Figure 1:
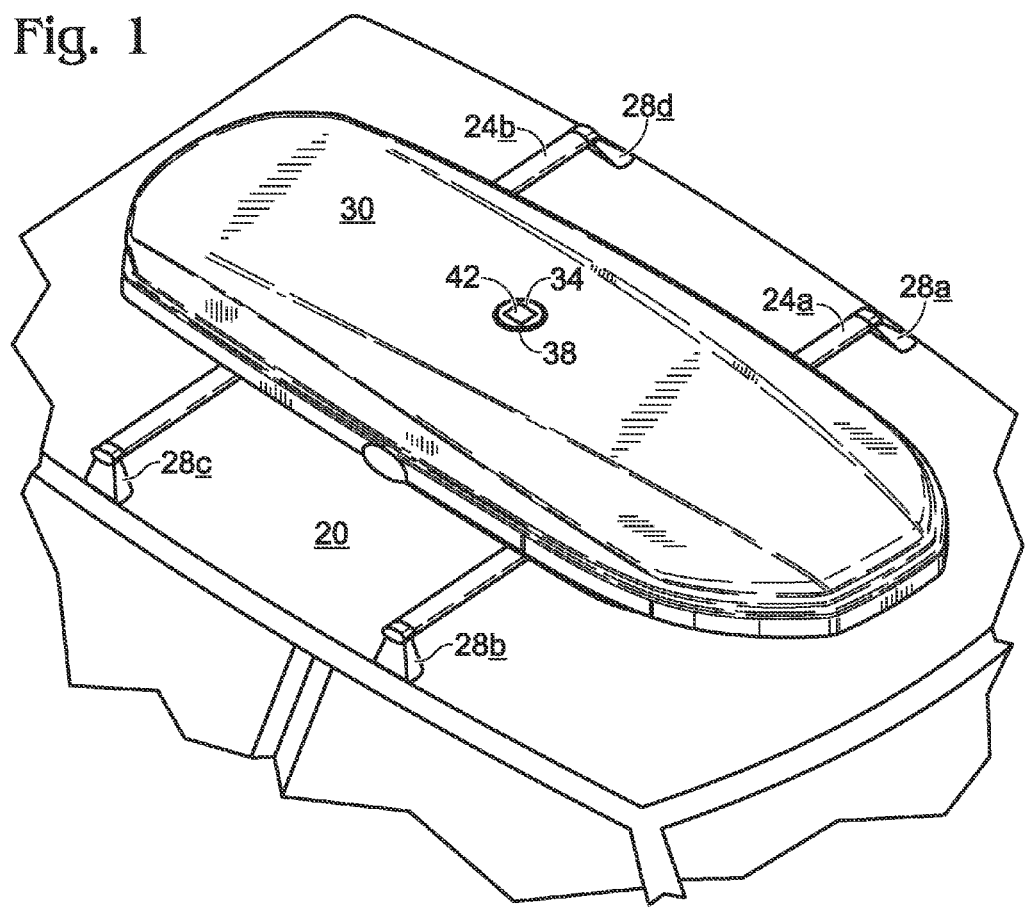
FIG. 1 is a perspective view of a cargo box mounted on a pair of cross bars on top of a vehicle.

FIG. 1 shows the roof of vehicle 20 equipped with a pair of crossbars 24a, 24b. Crossbars 24a, 24b are mounted on vehicle 20 via towers 28a-d. Cargo box 30 is mounted on crossbars 24a, 24b via clamps (not shown). Examples of clamps suitable for securing box 30 to crossbars 24a, 24b are disclosed in U.S. Pat. No. 6,918,521, which is hereby incorporated by reference.

Photovoltaic lid light device 34 is shown mounted in the lid of cargo box 30. Lid light 34 may be mounted centrally, approximately equidistant from the front and the back of box 30, and approximately equidistant from the lateral sides of box 30. Alternatively, lid light 34 may be positioned in other locations, forward, backward, or side-to-side, in the lid of cargo box 30. Further, although only one lid light is shown, multiple lid lights may be provided in the lid of cargo box 30. Lid light device 34, as shown in FIG. 1, has an outer circular shape 38. Rectangular photovoltaic panel 42 is also visible from the top view.

Figure 2:
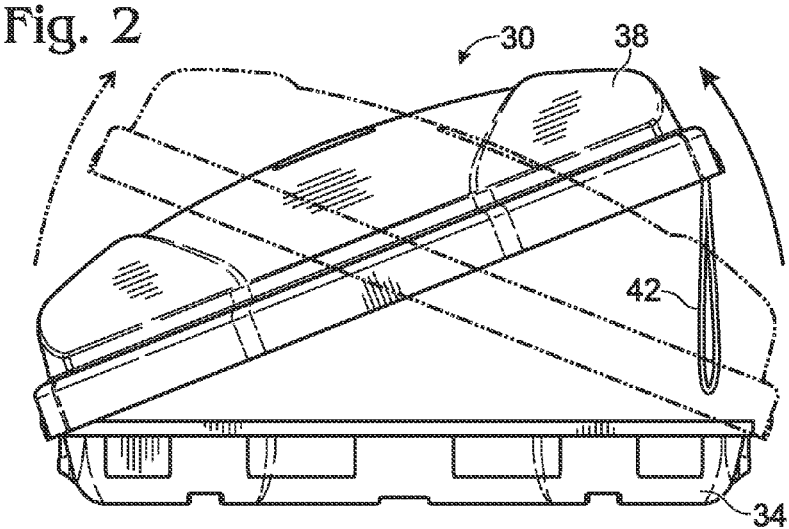
FIG. 2 is an end elevation view of the cargo box shown in FIG. 1.

FIG. 2 shows an end view of cargo box 30 including bottom portion 34 and lid 38. Cord 42 is provided for assisting with closing of lid 38. Lid 38 is hinged along each lateral side of bottom portion 34. An example of hinges, which alternatively function as latches, are shown in U.S. Pat. No. 7,503,470 which is hereby incorporated by reference. Other examples of hinge/latch devices which may be used to provide a dual-side opening box, as shown in FIG. 2, are shown in U.S. Pat. No. 7,740,157 and U.S. patent application Ser. No. 12/494,218 each of which is hereby incorporated by reference. FIG. 2 shows lid 38 pivoted into an open position, providing access to the interior of cargo box 30 when loading or unloading the box. Lid 38 is also shown in dashed lines opened to the opposite side. The overall height profile of cargo box 30 is preferably shallow or short, for example, about 11.5-inches, compared to other cargo boxes, to provide maximum clearance and minimize the risk of collision with garages or other overhead structures.

FIG. 3 shows the interior of lid 38. Lid 38 has opposing lateral sides 44a, 44b. Each of sides 44a, 44b has one or more hinge/latch components for providing dual-side opening capability. For example, as shown in FIG. 3, side 44a of lid 38 has hinge/latch components 50a-c. Similarly, side 44b of lid 38 has hinge/latch components 54a-c.

Lid 38 also has circumferential rim 56 which fits over the upper edge portion of bottom portion 34, as shown in FIG. 2, for preventing rain from entering the closed box, and for providing overall form stiffness to lid 38. Additionally, one or more stiffening structures may be secured to the interior surface of lid 38. For example, as shown in FIG. 3, three stiffening structures 58a-c are mounted in a parallel configuration, substantially perpendicular to the long axis of lid 38. Additional stiffening features may be employed, for example, as disclosed in U.S. patent application Ser. No. 11/606,638, which is hereby incorporated by reference. As shown in FIG. 3, lid light 34 includes semi-spherical light compartment 62, which descends from electronic compartment 66. Electronic compartment 66 is circumsurrounded by circular edge portion 70.

FIG. 4 shows a cross-sectional view through lid light assembly 34. The cross-sectional cut is taken in a direction parallel with the long axis of box 30. Lid 38 has a recessed form configured to receive the lid light assembly so that, when the lid light is installed, it is substantially flush with the exterior surface of lid 38. The lid receptacle (recessed form) has outer circular edge 80. Edge 80 descends to a circular first step 84. Graduated wall 88 descends from first step 84. Graduated wall 88 has a generally rectangular shape, as shown in FIG. 5. Graduated wall 88 merges into floor portion 92. Circular aperture 94 is defined in floor portion 92.

The lid receptacle receives cup assembly 100 which contains power, electronics, and lights for illuminating the interior of the box. Cup assembly 100 may be made of a transparent plastic material, for example, polycarbonate.

Cup assembly 100 includes cup portion 104, which mainly contains lights and electronics, and is mated to top portion 108 which contains and supports a solar cell. Top portion 108 is circular and dimensioned to seat on first step 84 of the lid receptacle. Top portion 108 is sealed and bonded to first step 84 by an adhesive, for example, foam/double-stick tape running continuously around the circumference of the light assembly. Rectangular photovoltaic cell 42 is contained behind a transparent lens in top portion 108. In a preferred embodiment, the photovoltaic cell is a standard cell commercially available from Sollight from Hood River, Oreg. Top portion 108 may be secured to cup portion 104 by screws (not shown). Gasket 112 is provided to seal top portion 108 to cup portion 104. Cup assembly 100 has two main compartments, namely, generally rectangular electronic compartment 114, and semi-spherical light compartment 116. Electronic compartment 114 contains circuit board 120 and rechargeable battery 124. Battery 124 is connected to, and rechargeable by, photovoltaic cell 42. Other electronic components are included, but are not shown in FIG. 4. For example, tilt sensors maybe provided for automatically switching the light on when lid 38 pivots to an open position, from either side of box 30. Tilt sensors/switches may also automatically turn the light off when the lid pivots back to its closed position (horizontal). Further, the device may be programmed to automatically turn off the light after the box has remained open beyond a certain period of time.

Electronic compartment 114 also has post 125 for receiving a screw from the interior of the lid for securing light 34 in lid 38. Other post and screw structures, preferably at least one more, may be provided for fastening the light to the lid along with the double-sided adhesive strip, previously described relative to the first step of the receptacle. Light compartment 116 includes convex frame structure 130 for anchoring an array of LED lights 136. In a preferred embodiment as shown in FIGS. 4 and 5, an array of LED lights 136 includes eight light elements in an array which alternates between a pair and a single light, for example, 2:1:2:1:2. The array may include a combination of spot and flood lights for providing optimal illumination over the longitudinal area inside a cargo box. For this purpose, a preferred array configuration has a substantially rectangular shape aligned with the rectangular shape of the box. A preferred light pattern array uses LED spotlights directed toward the ends of the box, and LED floodlights directed toward the middle portion of the box. For example, a preferred array uses a pair of spotlights, then one floodlight, then a pair of floodlights, then a single floodlight, then a pair of spotlights.

The light device may be programmed to conserve battery life by automatically switching off the light after a period of time, for example, 45-minutes. The tilt switch may be configured to work in any axis. For example, when the light is 15-degrees from horizontal in any direction, it turns on.

FIG. 5 shows a close-up perspective view of light 34 mounted in lid 38. The receptacle in lid 38 includes outer edge 80 surrounding first step 84. Graduated wall portion 88 is substantially rectangular, and descends from first step 84. Floor portion 92 provides a ledge for seating the bottom side of electronics compartment 114. Light compartment 116 descends through aperture 94 in floor portion 92. Light array 136 is configured, as described above, for providing optimal lighting to the interior space of cargo box 30.

In a preferred cargo box embodiment, the box weighs approximately 52 pounds. The box is approximately 92-inches long, 36-inches wide and 11.5-inches tall. A preferred box design has approximately 15 cubic feet of capacity, and may be made of ABS plastic or fiberglass.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A container for carrying cargo on top of a vehicle, the vehicle having a front, a back, and a long axis running from the back to the front of the vehicle, comprising a pair of crossbars for carrying cargo on top of a vehicle, an elongate box having an elongate axis, a bottom portion, a lid, two opposing opening sides parallel to the elongate axis, and a clamp system configured for securing the bottom portion of the box to the crossbars, the elongate axis of the box being substantially parallel to a long axis of the vehicle, the lid having a front end, a rear end, and two lateral sides running between the front and rear ends, the opening sides of the box corresponding to the lateral sides of the lid, each of the lateral sides of the lid being connected to the bottom portion of the box by a hinge assembly including multiple coordinated latch devices mounted along the respective lateral side of the lid, each latch configured to operate alternately as a latch and as a hinge, thereby allowing opening of the box from either opening side of the box, wherein the lid has an outer surface and a concave interior surface, a receptacle, defined in the outer surface of the lid, surrounding an aperture for providing access to the inside of the box, and a solar light device configured to seat in the receptacle of the lid, the solar light device having a photovoltaic cell exposed to the outside of the box and a lighting element directed to the interior space of the box, wherein the receptacle has a continuous first step below the outer surface of the lid, the light device having a circumferential top portion continuously sealed to the first step of the receptacle, wherein the receptacle has a wall descending from the first step, wherein the receptacle has a floor portion, the wall merging into the floor portion, the floor portion defining the aperture, the light device having a top portion and a cup portion, the cup portion having an electronics compartment and a light compartment, the receptacle being configured to support the electronics compartment of the light device above the aperture while allowing the light compartment to descend through the aperture for lighting the interior space of the box when the lid is in an open position.

2. The container of claim 1, wherein the top portion and the cup portion are sealed together to prevent water from entering the device.

3. The container of claim 1, wherein top portion and the cup portion are made of transparent material.

4. The container of claim 3, wherein the top portion and the cup portion are made of polycarbonate.

5. The container of claim 1, wherein the electronics compartment is substantially rectangular, and the light compartment is semi-spherical.

6. The container of claim 1, wherein the top portion of the light device has a lens portion covering the photovoltaic cell.

7. The container of claim 1, wherein the first step is substantially circular and the wall is generally rectangular.

8. The container of claim 1, wherein the light compartment contains an array of LED's configured to provide light to an elongate rectangular space.

9. The container of claim 8, wherein the array of LED's includes at least one spot light and at least one flood light.

10. The container of claim 8, wherein the array includes a series of rows of LED's including: (a) a pair of spot LED's, (b) a single flood LED, (c) a pair of flood LED's, (d) a single flood LED, and (e) a pair of spot LED's, the array being oriented along a direction perpendicular to a long axis of the box.

11. The container of claim 1, wherein the light device has a switch which turns the light device on when the switch senses pivoting of the lid beyond a selected threshold angle away from horizontal.

12. The container of claim 11, wherein the switch senses pivoting of the lid on either side of the box.

13. The container of claim 11, wherein the switch also turns off the light device automatically when the lid is pivoted back to a horizontal position.

14. The container of claim 1, wherein the light device includes a timer which automatically turns the light device off after a certain period of being on with the lid in an open position.

15. A container for carrying cargo on top of a vehicle, comprising
  an elongate box having an elongate axis, a bottom portion, a lid, and a clamp system configured for securing the bottom portion of the box to a pair of crossbars, the lid having a front end, a rear end, and two lateral sides running between the front and rear ends, at least one of the lateral sides of the lid being hinged to the bottom portion allowing the lid to pivot between open and closed positions, wherein the lid has an outer surface and a concave interior surface, a receptacle, defined in the outer surface of the lid and forming a recess surrounding an aperture for providing access to the inside of the box, and
  a solar light device configured to seat in the receptacle of the lid, the solar light device having a photovoltaic cell exposed to the outside of the box and a lighting element directed to the interior space of the box, wherein the receptacle has a continuous first step below the outer surface of the lid, the light device having a circumferential top portion disposed in the recess and continuously sealed to the first step of the receptacle in the recess.

16. The container of claim 15, wherein each side of the lid is connected via a hinge/latch assembly to the bottom portion, providing opening access capability, alternately, from each side of the lid.

17. The container of claim 15, wherein the solar light device has a top portion and a cup portion sealed together to prevent water from entering the device.

18. The container of claim 17, wherein top portion is made of transparent material and covers the photovoltaic cell.

19. The container of claim 17, wherein the cup portion has an electronics compartment and a light compartment.

20. The container of claim 19, wherein the electronics compartment is substantially rectangular, and the light compartment is semi-spherical.

21. The container of claim 19, wherein the light compartment contains an array of LED's configured to provide light to an elongate rectangular space.

22. The container of claim 21, wherein the array of LED's includes at least one spot light and at least one flood light.

23. The container of claim 21, wherein the array includes a series of rows of LED's including: (a) a pair of spot LED's, (b) a single flood LED, (c) a pair of flood LED's, (d) a single flood LED, and (e) a pair of spot LED's, the array being oriented along a direction perpendicular to a the long axis of the box.

24. The container of claim 15, wherein the receptacle has a graduated wall descending from the first step, the first step being substantially circular and the wall being generally rectangular.

25. The container of claim 24, wherein the receptacle has a floor portion, the wall merging into the floor portion, the floor portion having an aperture, the light device having a top portion and a cup portion, the cup portion having an electronics compartment and a light compartment, the receptacle being configured to support the electronics compartment of the light device while allowing the light compartment to descend through the aperture for lighting the interior space of the box when the lid is in a open position.

26. The container of claim 15, wherein the light device has a switch which turns the light device on when the switch senses pivoting of the lid beyond a selected threshold angle away from horizontal.

27. The container of claim 26, wherein the switch also turns off the light device automatically when the lid is pivoted back to a horizontal position.

28. The container of claim 15, wherein the light device includes a timer which automatically turns the light device off after a certain period of being on with the lid in an open position.

29. A container for carrying cargo on top of a vehicle, comprising
  an elongate box having an elongate axis, a bottom portion, a lid, and a clamp system configured for securing the bottom portion of the box to a pair of crossbars, the lid having a front end, a rear end, and two lateral sides running between the front and rear ends, at least one of the lateral sides of the lid being hinged to the bottom portion allowing the lid to pivot between open and closed positions, wherein the lid has an outer surface and a concave interior surface, a receptacle defined in the outer surface of the lid and forming a recess surrounding an aperture for providing access to the inside of the box, and
  a solar light device configured to seat in the receptacle of the lid, the solar light device having a photovoltaic cell exposed to the outside of the box and a lighting element directed to the interior space of the box, the solar light device having an upwardly facing top surface that is substantially flush with the outer surface of the lid when the light device is seated in the receptacle.

* * * * *